(12) United States Patent
Sayers et al.

(10) Patent No.: US 7,447,991 B2
(45) Date of Patent: Nov. 4, 2008

(54) DOCUMENT AGENTS

(75) Inventors: Craig P. Sayers, Sunnyvale, CA (US); David I. Bell, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 660 days.

(21) Appl. No.: 10/114,384

(22) Filed: Apr. 1, 2002

(65) Prior Publication Data
US 2004/0205574 A1    Oct. 14, 2004

(51) Int. Cl.
G06F 17/00 (2006.01)
G06F 17/20 (2006.01)

(52) U.S. Cl. .................. 715/234; 715/236; 715/255

(58) Field of Classification Search .......... 715/513, 715/530, 537, 234, 236, 255
See application file for complete search history.

(56) References Cited

U.S. PATENT DOCUMENTS

| | | | | |
|---|---|---|---|---|
| 5,603,031 A * | 2/1997 | White et al. | ................ | 719/317 |
| 5,835,914 A * | 11/1998 | Brim | ........................ | 707/206 |
| 5,944,781 A * | 8/1999 | Murray | ...................... | 709/202 |
| 6,125,391 A * | 9/2000 | Meltzer et al. | ............. | 709/223 |
| 6,163,794 A * | 12/2000 | Lange et al. | ................ | 709/202 |
| 6,304,864 B1 * | 10/2001 | Liddy et al. | ................... | 706/15 |
| 6,377,928 B1 * | 4/2002 | Saxena et al. | ............... | 704/275 |
| 6,539,416 B1 * | 3/2003 | Takewaki et al. | ............ | 709/202 |
| 6,578,192 B1 * | 6/2003 | Boehme et al. | ............ | 717/115 |
| 6,601,057 B1 * | 7/2003 | Underwood et al. | .......... | 707/1 |
| 6,604,135 B1 * | 8/2003 | Rogers et al. | ............... | 709/217 |
| 6,691,151 B1 * | 2/2004 | Cheyer et al. | ............... | 709/202 |
| 6,715,129 B1 * | 3/2004 | Hind et al. | .................. | 715/513 |
| 6,718,516 B1 * | 4/2004 | Claussen et al. | ............ | 715/513 |
| 6,732,330 B1 * | 5/2004 | Claussen et al. | ............ | 715/513 |
| 6,735,632 B1 * | 5/2004 | Kiraly et al. | ................ | 709/229 |
| 6,766,333 B1 * | 7/2004 | Wu et al. | .................... | 707/201 |
| 6,772,109 B2 * | 8/2004 | Tsuchitani et al. | ............ | 704/2 |
| 6,772,408 B1 * | 8/2004 | Velonis et al. | .............. | 717/100 |
| 6,931,416 B2 * | 8/2005 | Kelley et al. | ................ | 707/102 |
| 6,993,713 B2 * | 1/2006 | Wendt | ........................ | 715/223 |
| 7,051,069 B2 * | 5/2006 | Smithline et al. | ........... | 709/203 |
| 7,072,883 B2 * | 7/2006 | Potok et al. | .................... | 707/3 |
| 7,096,455 B2 * | 8/2006 | Santiago | ...................... | 717/114 |
| 7,165,243 B1 * | 1/2007 | Pelegri-Llopart et al. | ... | 717/136 |
| 7,328,234 B1 * | 2/2008 | Nedbal et al. | ............... | 709/202 |
| 2001/0000537 A1 * | 4/2001 | Inala et al. | ................... | 707/500 |
| 2001/0016873 A1 * | 8/2001 | Ohkado et al. | ............. | 709/205 |
| 2002/0052954 A1 * | 5/2002 | Polizzi et al. | ............... | 709/225 |
| 2002/0072998 A1 * | 6/2002 | Haines et al. | ................. | 705/28 |
| 2002/0120641 A1 * | 8/2002 | Rozek et al. | ................ | 707/500 |
| 2002/0138556 A1 * | 9/2002 | Smithline et al. | ........... | 709/203 |

(Continued)

OTHER PUBLICATIONS

ESPRIT / LTR / 24-939 Agent Report, Agent Consortium, downloaded from: agent.ign.fr/deliverable.DA1.pdf, Feb. 8, 2001, pp. 1-44.*

(Continued)

*Primary Examiner*—John Breene
*Assistant Examiner*—Robert Stevens

(57) ABSTRACT

A document agent. The document agent comprises a structure having elements that are readable by a web-browser to display as a web page. The structure also has embedded code to function as a software agent. Therefore, the structure functions as both a web page and as a software agent.

27 Claims, 9 Drawing Sheets

U.S. PATENT DOCUMENTS

| | | | |
|---|---|---|---|
| 2002/0152260 A1* | 10/2002 | Chen et al. | 709/202 |
| 2002/0184527 A1* | 12/2002 | Chun et al. | 713/201 |
| 2002/0198719 A1* | 12/2002 | Gergic et al. | 704/270.1 |
| 2003/0084059 A1* | 5/2003 | Kelley et al. | 707/102 |
| 2003/0120762 A1* | 6/2003 | Yepishin et al. | 709/223 |
| 2003/0125966 A1* | 7/2003 | Viswanath et al. | 705/1 |
| 2003/0188040 A1* | 10/2003 | Vincent | 709/317 |
| 2003/0200301 A1* | 10/2003 | Trzcinko et al. | 709/223 |
| 2003/0217096 A1* | 11/2003 | McKelvie et al. | 709/202 |
| 2004/0030741 A1* | 2/2004 | Wolton et al. | 709/202 |
| 2005/0210456 A1* | 9/2005 | Chen et al. | 717/136 |

OTHER PUBLICATIONS

Repenning, Alexander, et al., "The Agentsheets Behavior Exchange: Supporting Social Behavior Processing", CHI '97 Demonstrations, Mar. 22-27, 1997, pp. 26-27.*

Ardissono, L., et al., "An Agent Architecture for Personalized Web Stores", Autonomous Agents '99, Seattle, WA, © 1999, pp. 182-189.*

Wong, David, et al., "Java-Based Mobile Agents", Communications of the ACM, vol. 42, No. 3, Mar. 1999, pp. 92-102.*

Orfali, Robert, et al., The Essential Distrubuted Objects Survival Guide, John Wiley & Sons, Inc., New York, NY, © 1996, pp. 3-6, 255-257 and 399-405.*

Cagalayan, Alper, et al., Agent Sourcebook: A Complete Guide to Desktop, Internet and Intranet Agents, John Wiley & Sons, Inc., New York, NY, © 1997, pp. 106-113, 120-129, 293-297 and 323-327.*

Liu, Jiming, et al. (eds.), E-Commerce Agents, Springer Verlag, Heidelberg, German, © 2001, pp. 295 and 312-316.*

Milojicic, Dejan S., et al., "Process Migration", ACM Computing Surveys, vol. 32, No. 3, Sep. 2000, pp. 241-267 [ACM 0360-0300/01/0900-241].*

Emmerich, Wolfgang, et al., "Implementing Code Migration with XML", Proceedings of the 22nd ICSE, Limerick, Ireland, Jun. 2000, pp. 397-406 [ACM 23000 1-58113-206-9/00/06].*

Wang, Alf Inge, "Experience Paper: Implementing a Multi-Agent Architecture for Cooperative Software Engineering", Dept: of Computer and Information Science, Norwegian University of Science and Technology, Trondheim, Norway, Jan. 17, 2000, pp. 1-15.*

Aridor, Yariv, et al., "Agent Design Patterns: Elements of Agent Application Design", Autonomous Agents '98, Minneapolis, MN, © 1998, pp. 108-115 [ACM 0-89791-983-1/98/5].*

Lange, Danny B., et al., "Seven Good Reasons for Mobile Agents", Communications of the ACM, vol. 42, No. 3, Mar. 1999, pp. 88-89 [ACM 0002-0782/99/0300].*

Grosof, Benjamin N., et al., "A Declarative Approach to Business Rules in Contracts: Courteous Logic Programs in XML", E-Commerce '99, Denver, CO, Nov. 1999, pp. 68-77 [ACM 1-58113-176-3/99/0011].*

Taylor, Nick, et al., "Survey of Autonomous Agents and Service Interaction", ESPRIT Project No. 25 338, Work Packages D and F, Deliverables DD1 and DF1, Oct. 23, 1997, pp. i-iii and 1-10.*

Labrou, Yannis, et al., "The Current Landscape of Agent Communication Languages", Laboratory for Advanced Info Technology, CS and EE Dept., UMBC, Catonsville, MD, © 1999, pp. 1-11 (downloaded from: www.umbc.edu/~finin/papers/ieee99.pdf).*

Falchuk, Benjamin, et al., "The Mobile Agent Paradigm Meets Digital Document Technology: Designing for Autonomous Media Collection", Multimedia Tools and Applications, vol. 8, No. 1, Jan. 1999, pp. 137-166.*

Petrie, Charles J., "Agent-Based Engineering, the Web and Intelligence", IEEE Expert, vol. 11, Issue 6, Dec. 1996, pp. 24-29.*

Eriksson, Joakim, et al., "To Each and Everyone an Agent: Augmenting Web-Based Commerce with Agents", Proceedings of the International Workshop on Intelligent Agents on the Internet and Web, Mexico City, Mexico, pp. 1-10.*

Manola, Frank, "Technologies For A Web Object Model", IEEE Internet Computing, vol. 3, No. 1, Jan./Feb., 1999, pp. 38-47.*

Ciancarini, Paolo, et al., "Managing Complex Documents Over the WWW: A Case Study for XML", IEEE Transactions On Knowledge And Data Engineering, vol. 11, No. 4, Jul./Aug., 1999, pp. 629-638.*

Köppen, Eckhart, et al., "Active Hypertext for Distributed Web Applications", ICE '99, Stanford, CA, Jun. 16-18, 1999, pp. 297-302.*

Haustein, Stefan, et al., "Towards Information Agent Interoperability", CIA 200, LNAI 1860, Springer-Verlag, Berlin, Germany, © 2000, pp. 208-218.*

Ciancarini, Paolo, "Multiagent: Coordination: A Computer Science Perspective", MAAMAW '01, Annecy, France, May 2-4, 2001, pp. 1-32.*

Schmidt, Heinz W., et al., "Shared XML Documents in Service Centers of the Future", Proc. of the 1st International Conf. on Web Information Systems Engineering, Hong Kong, China, Jun. 19-21, 2000, pp. 105-112.*

Ensel, Christian, et al., "Managing Application Service Dependencies with XML and the Resource Description Framework", Integrated Network Management Proceedings, Seattle, WA, May 14-18, 2001, pp. 661-674.*

Han, Richard, et al., "WebSplitter: a Unified XML Framework for Multi-Device Collaborative Web Browsing", CSCW '00, Philadelphia, PA, Dec. 2-6, 2000, pp. 221-230.*

Aoki, Yoshinori, "Collaborative Environment for Supporting Users", 2001 IEEE International Conf. on Systems, Man and Cybernetics, Tucson, AZ, Oct. 7-10, 2001, pp. 2309-2316.*

Hilbert, David M., et al., "Agents for Collecting Application Usage Data Over the Internet", Autonomous Agents '98, Minneapolis MN, © 1998, pp. 149-156.*

Lange et al., "A New Internet Agent Scripting Language Using XML" Jun. 27, 2005, 4 pages.

Taylor et al. "ESPRIT Project No. 25 338, Work package D: Autonomous Agents" May 5, 1998 47 pages.

Triep et al. "ESPRIT Project No. 25 338, Work package H: User Access" May 5, 1998 32 pages.

* cited by examiner

120

```xml
<?xml version="1.0" encoding="UTF-8"?>
<?xml-stylesheet type="text/xsl" href="duringMeeting.xsl"?>

<program name="meeting42">
<annotation>An agent to record notes from everyone during meeting 42</annotation>

<data ID="history">
</data>

<behaviour name="main">
    <var ID="count">0</var>
    <code>
        var message = FIPAReceive ( );
        var messageContent = FIPAParseContent (message) ;
        var history = XPathAPI.selectSingleNode ( "program/data" ) ;
        history.appendChild (messageContent) ;
        var reply = message.createReply ( ) ;
        reply.setPerformative (7) ;
        reply.setContent ( "done" ) ;
        FIPASend ( reply ) ;
        count ++ ;
    </code>
</behaviour>

</program>
```

```xml
<?xml version="1.0" encoding="UTF-8"?>
<?xml-stylesheet type="text/xsl" href="duringMeeting.xsl"?>

<program name="meeting42">
<annotation>An agent to record notes from everyone during
meeting 42</annotation>

<data ID="history">
<item> Prepare notes From the meeting</item>
</data>

<behaviour name="main">
    <var ID="count">0</var>
    <code>
    var message = FIPAReceive ( );
    var messageContent = FIPAParseContent (message) ;
    var history = XPathAPI.selectSingleNode ( "program/data" ) ;
    history.appendChild (messageContent) ;
    var reply = message.createReply ( ) ;
    reply.setPerformative (7) ;
    reply.setContent ( "done" ) ;
    FIPASend ( reply ) ;
        count ++ ;
    </code>
</behaviour>

</program>
```

Annotations: 705, 710, 720, 790, 740, 730, 750, 755, 760, 765, 770, 775, 780, 785

Fig. 7B

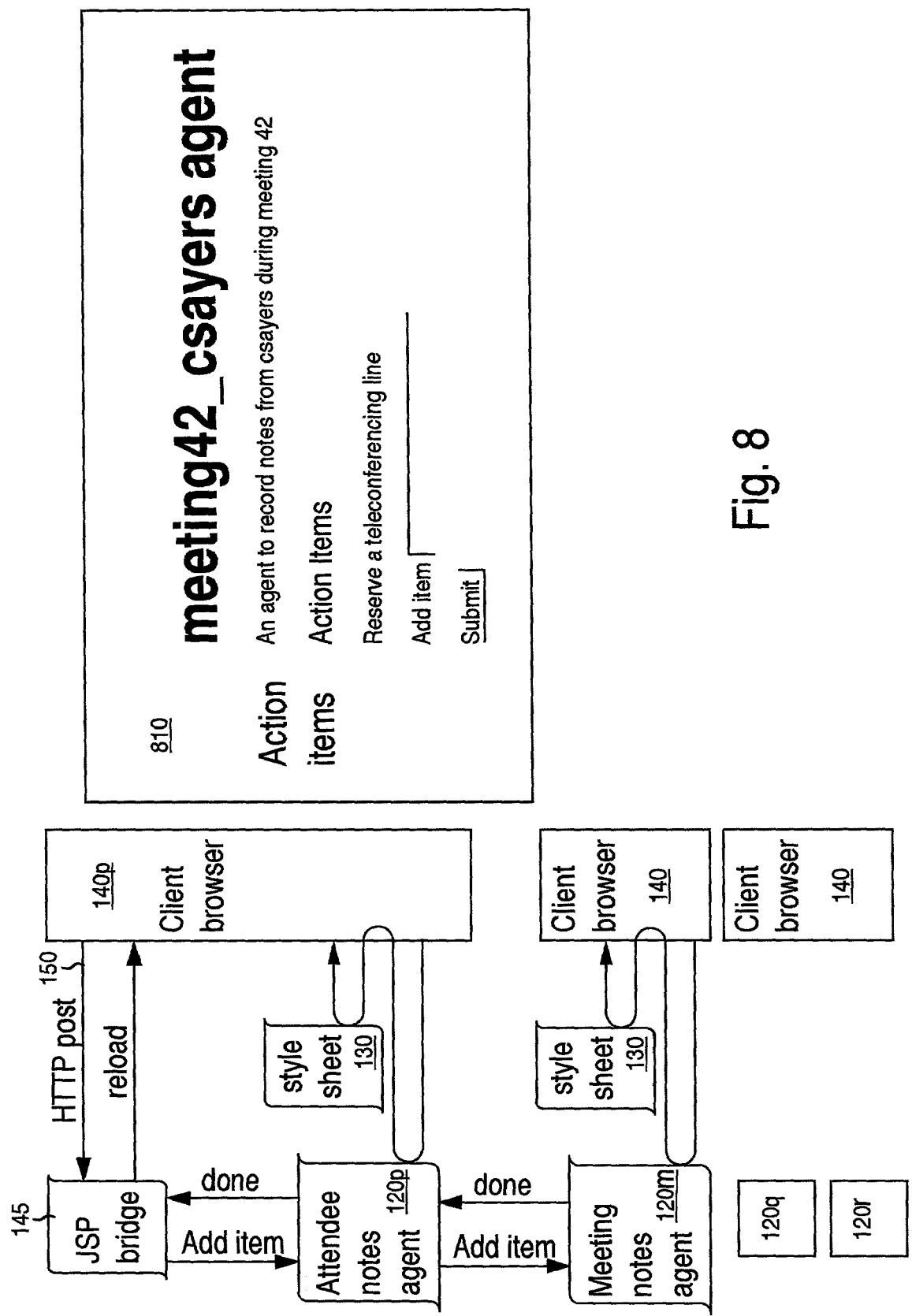

DOCUMENT AGENTS

TECHNICAL FIELD

The present invention relates to the fields of software agents and web page development. Specifically, the present invention relates to a software agent that is also viewable as a web page.

BACKGROUND ART

Conventionally, the World Wide Web has used HTML (Hyper-Text Markup Language) to encode documents (e.g., web pages). HTML was primarily intended for human consumption and hence has limitations with respect to the ability to perform more complex functions involving web documents, which may be static or dynamic. While the content of static web documents are fixed, the content of dynamic web documents may change. In this fashion, the web document may meet a user request for information, may provide a changing graphical display, etc. Conventionally, creating a dynamic web document involves combining stylesheets and scripts to create such web documents, which change in response to user interactions.

Conventional methods to generate dynamic web pages include using a JSP (Java Server Page) or using an ASP (Active Server Page). In the JSP case, a file containing a combination of JSP tags, HTML code and Java code is transformed into Java source code, compiled, and the resulting executable is run to generate a customized web page. The JSP file is transformed and compiled the first time it is accessed and also whenever the JSP source page is newer than the compiled version. The ASP technology is analogous to the JSP technology but uses Visual Basic as a primary server side scripting language.

Unfortunately, the above-mentioned conventional methods have several limitations. One such limitation relates to the ability to save the state associated with a web-page the user was accessing, such that the user may leave and come back to the web-page to pick up where the user left off. For example, a dynamic web-page may be designed to walk a user through a number of steps to complete a process. A user accessing such a web-page may go off-line and come back to finish later. While some conventional systems may allow for this, the technique is often complex because the state associated with where the user is in the process must be linked to the copy of the code that was used to create the dynamic web page. Thus, multiple items must be saved (e.g., the identity of the page and the version of the code used to access it) and they must be linked together.

Some conventional methods also face difficulties when updating the code that accesses web pages. For example, a single piece of code (e.g., a JSP) is used to process incoming requests for web pages for multiple users. From time to time, this code must be re-compiled. Using the example above in which a user leaves a process and wishes to come back later, the code may have been re-compiled between the time the user left and the time the user returned. The newly compiled code may not allow the user to complete the process properly and saving the old code is logistically unattractive. Hence, problems of mixing old and new code arise.

An additional problem with such conventional methods is that they are not well-suited to providing machine-readable descriptions. For example, while the markup tags in HTML define how the content is to be formatted, they do not describe the content itself. Recently, XML (Extensible Markup Language) has been used to encode web-pages. In particular, with the introduction of higher-level representations such as RDF (Resource Description Format), it is practical to provide web pages that contain machine-readable descriptions. In this evolution of the World Wide Web to the Semantic Web, it is suggested that web pages may become a store of data to be mined by autonomous software agents.

Software agents are software routines that wait in the background and perform an action when a specified event occurs. Software agents may be autonomous, acting on behalf of the user. Some agents are intelligent, learning and adapting to environmental conditions. Software agents may perform a number of other tasks such as, information retrieval. In this example, a user may send a software agent to gather information on a specified topic while the user is off-line. When the user returns, the information is waiting. As another example, a software agent may function as a broker, seeking out prices for a specified product and returning a list to the users. As yet another example, software agents may transmit a summary file on the first day of the month or monitor incoming data and alert the user when a certain transaction has arrived.

One conventional method of coding agents is to describe the agent using a custom programming language with an XML syntax. While this may be effective for manipulating XML expressions, it requires that a new language be learned.

Other conventional systems may not require that a new language be learned to code the agent; however, the agent itself is not directly accessible. Consequently, debugging such an agent is complicated.

Therefore, one problem with conventional web access methods is the difficulty of saving the state associated with a web page. Another problem is the complexities involved in accessing a saved web page when the code that is used to access the web page is updated. An additional problem is the difficulty of providing web pages with machine-readable descriptions. Still other problems involve coding and debugging software routines such as agents.

DISCLOSURE OF THE INVENTION

The present invention pertains to document agents. A document agent comprises a structure having elements that are readable by a web-browser to display as a web page. The structure also has embedded code to function as a software agent. Therefore, the structure functions as both a web page and as a software agent.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 7A and FIG. 7B are diagrams illustrating exemplary document agents, according to embodiments of the present invention.

FIG. 8 is a diagram illustrating an example of using document agents, according to embodiments of the present invention.

BEST MODE FOR CARRYING OUT THE INVENTION

Embodiments of the present invention provide for entities that function as both a software agent and a web-accessible document. Among the advantages of embodiments of the present invention are that the state associated with a web page implemented by a document agent may be conveniently saved, the document agents may be updated easily and still allow saved web-pages to be easily accessed, and document agents provide machine-readable descriptions of web pages. Additionally, coding and debugging document agents is relatively easy and does not require that a special software language be learned.

Figure 1:
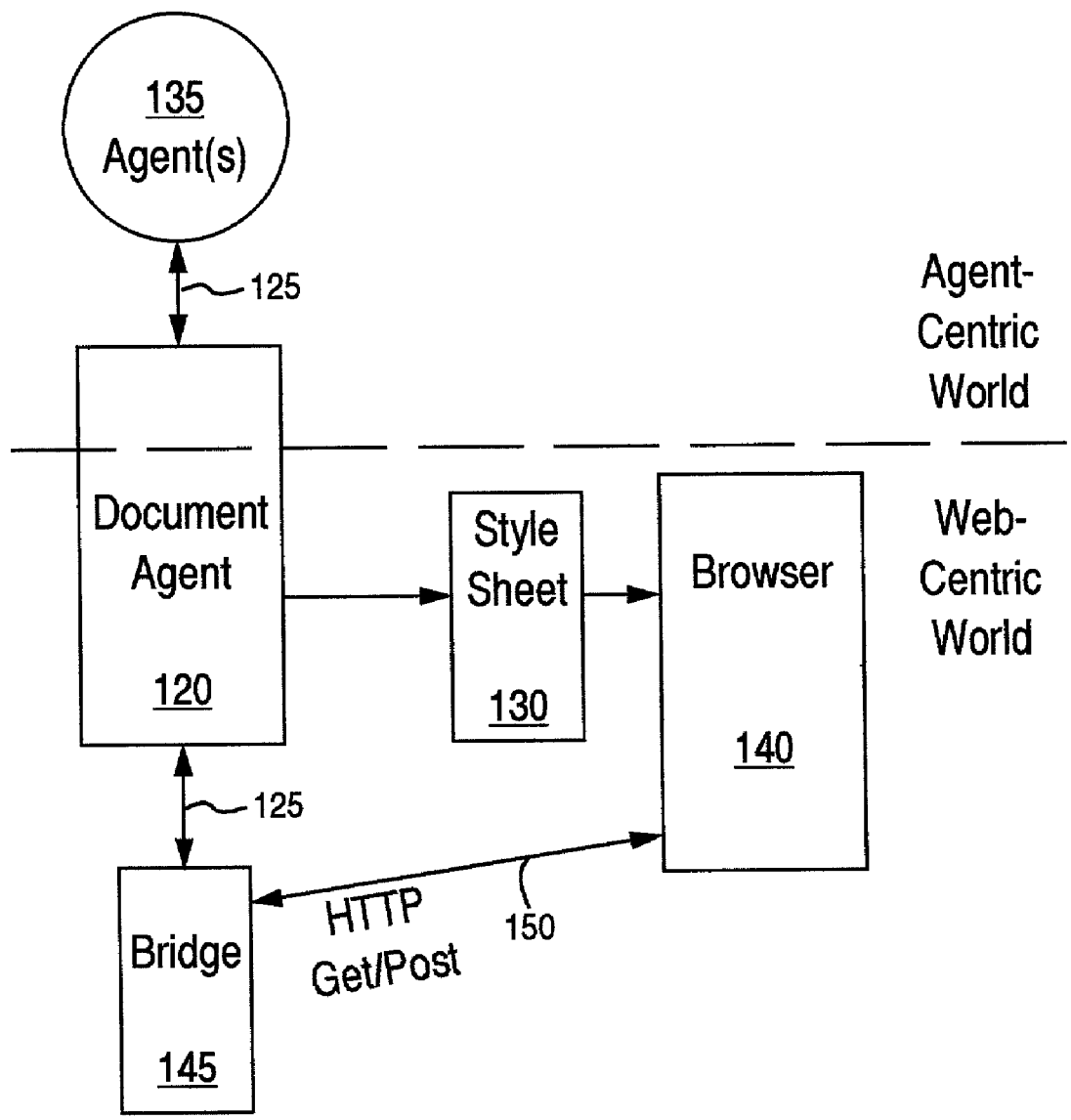
FIG. 1 is a diagram illustrating a document agent being accessed by a web-browser and acting as a software agent, according to embodiments of the present invention.

Referring now to FIG. 1, embodiments of the present invention provide for entities that function as both a software agent and a web-accessible document. Throughout this description, the terms document agent 120, agent document 120, software agent document 120, or the like may be used to refer to such entities. When viewed from the software agent world, document agents 120 resemble conventional software agents 135. As such, they are responsive to messages 125, such as, for example, agent communication language (ACL) messages. In this fashion, document agents 120 will respond to a message 125 in a similar fashion as a conventional software agent 135. Document agents 120 may communicate both with other document agents 120 and with software agents 135 that are not document agents 120 (e.g., an embodiment may build on top of a JADE (Java Agent Development Environment) agent platform). Embodiments provide for document agents 120 that may communicate with any FIPA (Foundation for Intelligent Physical Agent) compliant agent.

Still referring to FIG. 1, when visible on a web server, document agents 120 may function analogously to conventional web documents. Embodiments of the present invention code the document agents 120 in XML (Extensible Markup Language). For purposes of illustration, examples using XML will be described herein. However, the present invention is not limited to coding the document agent 120 in XML. The document agents 120 may be read as web pages by formatting them with, for example, stylesheets 130. For example, an XSLT (Extensible Stylesheet Language Transformation) stylesheet 130 may be applied to the document agent 120 by a client browser 140. Furthermore, the state of the document agent 120 may be examined by using Xpath/Xpointer expressions to look inside the XML document.

Still referring to FIG. 1, a document agent 120 may perform processing in response to web-based queries. For example, a JSP (Java Server Page) bridge 145 may receive HTTP get/post operations or methods 150 and convert them into ACL messages 125, which the JSP bridge 145 sends to the document agent 120.

A system for providing document agents 120 is illustrated in FIG. 2A Server 210 has attached to it memory storage 220 for storing document agents 120. When a document agent 120 is to be used, it may be read into main memory 240 and executed with the aid of the processor 230. A document agent 120 may include its own data, code and state. As the document agent 120 processes messages 125, it stores any updated data, code or state by modifying its own XML document. For example, if a document agent 120 X performs a single unit of execution, a new document agent 120 X' is generated, which replaces the original. Thus, the state is stored within the document agent 120. By returning the updated document agent 120 to memory storage 220, its state, code, and data are made persistent.

All of the usual operations on files apply to document agents 120. The last-modified date on the document agent 120 file serves as a convenient indication of recent activity by that document agent 120. An embodiment of the present invention shows a list of document agents 120 on the system, and color-codes them based on how recently they were used. A document agent 120 may be cloned by copying the document agent 120. The document agent 120 may be migrated by moving the document agent 120, as is illustrated by the document agent 120 being sent to the upper server 210 in FIG. 2.

Figure 2:
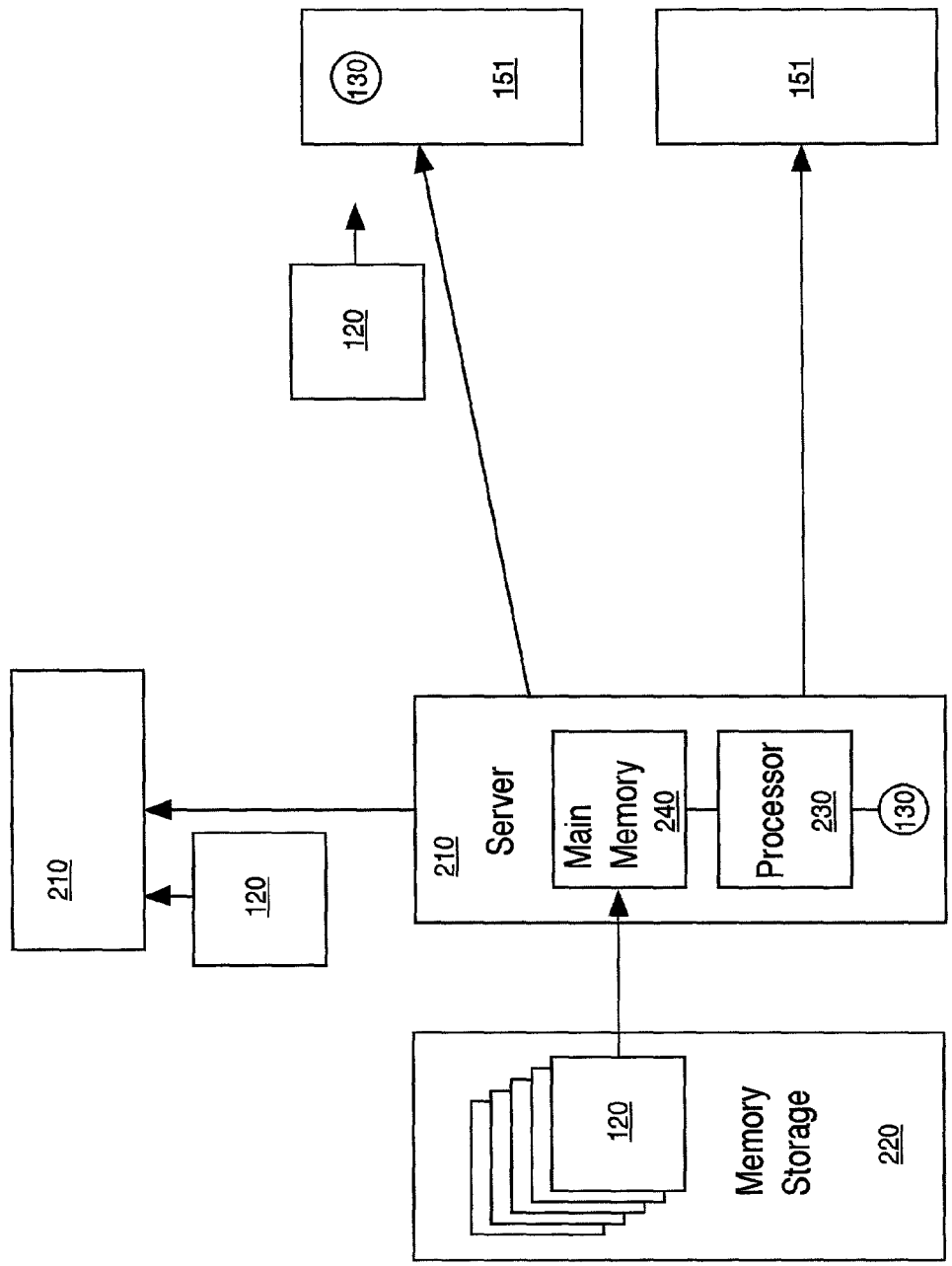
FIG. 2 is a diagram illustrating system for providing document agents, according to embodiments of the present invention.

Still referring to FIG. 2, document agents 120 may be sent to nodes 151, where a stylesheet 130 may be applied to read the document agent 120 as a web page. A stylesheet 130 may also be applied to a document agent 120 on the server 210, in which case the node 151 receives a processed version of the document agent 120. Thus, different "views" of document agent 120 are possible by applying different stylesheets (e.g., XSLT) to the document agents 120.

Figure 3:
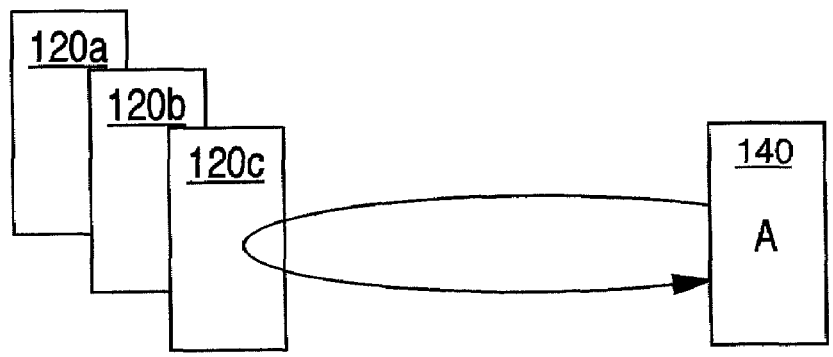
FIG. 3 is a diagram illustrating users interacting with document agents, according to embodiments of the present invention.
Figure 3:
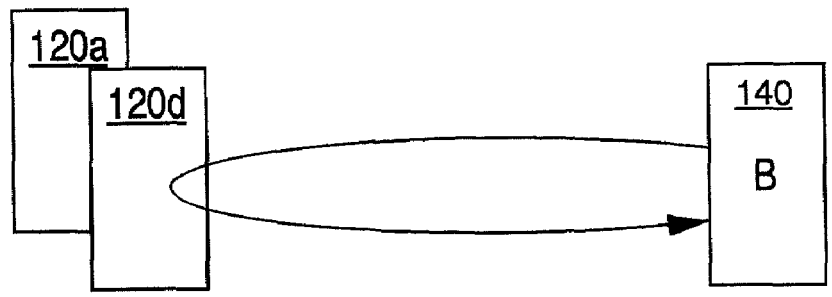
Figure 3:
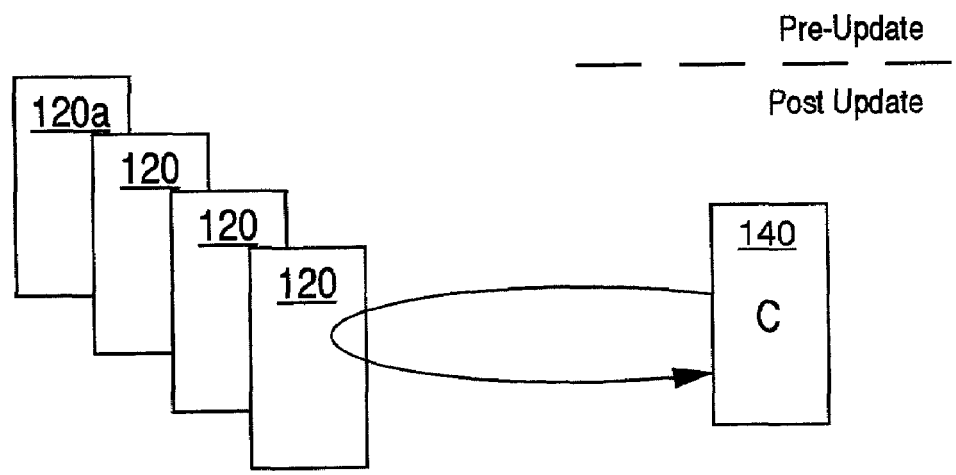

Because the code and state are stored locally, within the document agent 120, they are independent of other changes in the system. Referring now to FIG. 3, an example is illustrated in which a number of users are interacting with document agents 120 that originated from a common document agent 120a. For example, each user may be filling out a sequence of forms via a web browser 140. A new document agent 120 is cloned for each combination of user and sequence. Thus, user A is shown interacting with document agent 120c, which has been generated from document agent 120b, which was generated from document agent 120a. Since the document agent 120 may update itself, document agents 120a, 120b, 120c, may contain different code, state and/or data. User B is illustrated in the second step of an analogous process. User B starts with a copy of document agent 120a that user A started with. However, the second document agent 120d that user B interacts with is not necessarily be the same as the second document agent 120b that user A used, because the content and form of document agent 120d will depend on the interaction user B had with document agent 120a. Thus, each user's interaction is with a particular custom document agent 120. That document agent 120 remembers where their particular user is in the sequence of forms. The user may stop and resume at any time.

In order to upgrade the system, the common document agent 120a may be updated. Thus, if user C starts the process after the update, user C starts with document agent 120a'. However, previously created document agents 120 are unaffected. Thus, if user A halts the process to return to it later, the document agent 120 user A works with will have a consistent interface throughout the remainder of the sequence of forms.

Figure 4:
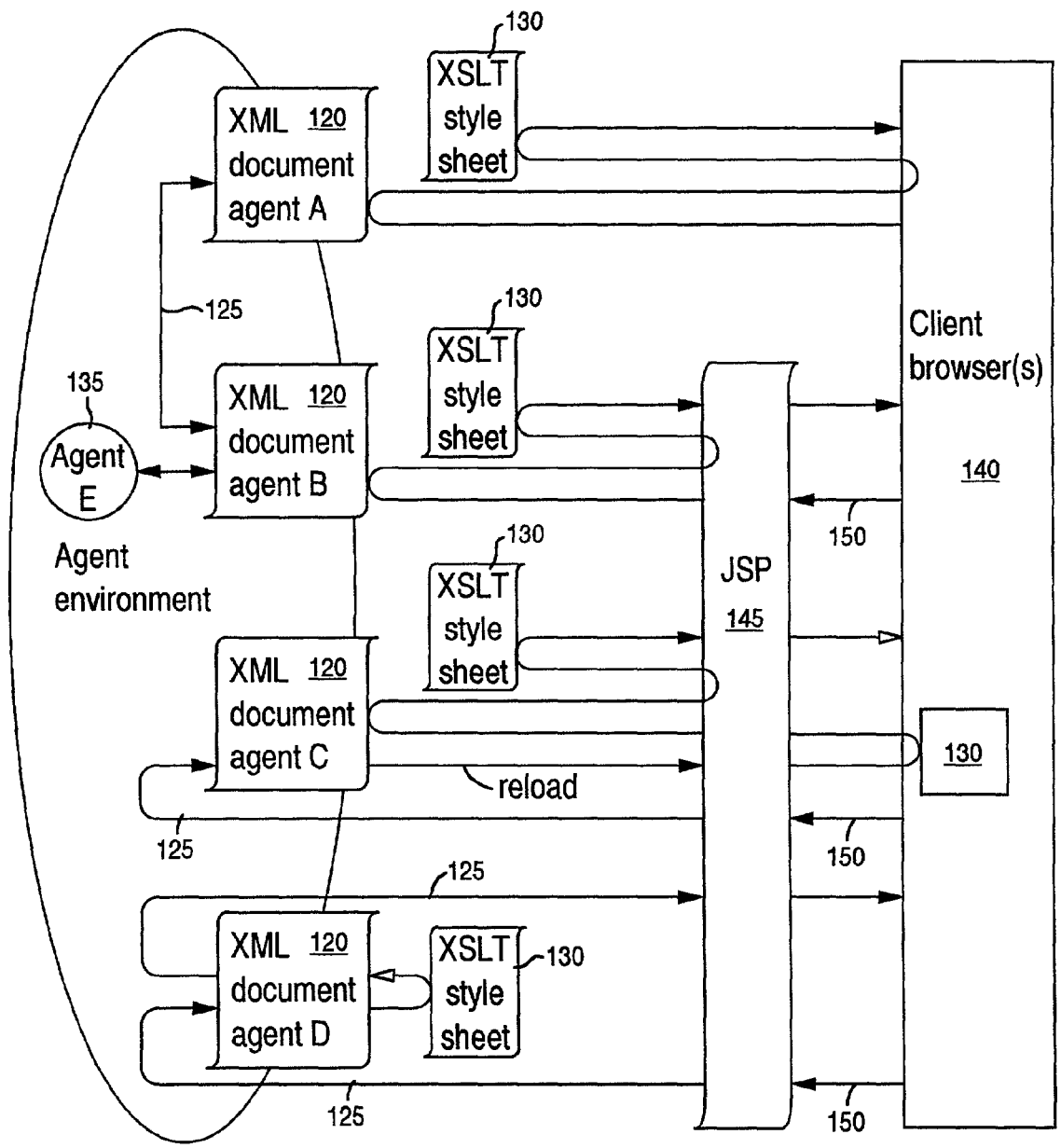
FIG. 4 is a diagram illustrating a document agent system, according to embodiments of the present invention.

Referring now to FIG. 4, four embodiment are illustrated: client side, server side, document agent 120 responsive, and document agent 120 generated. At the top of the illustration, the client browser 140 links to a single stylesheet 130 from within the document agent 120; then the client browser 140 can directly load the document agent 120 and apply the stylesheet 130 locally. In this case, all of the processing is occurring on the client node 151 (e.g., analogously to an XML document that is not a document agent 120).

Referring now to the server side embodiment, a JSP bridge 145 applies a stylesheet 130 to the document agent 120 on a server 210. This may be more robust than reading the document agent 120 with a client browser 140 because issues of incompatibilities in style-sheet processing among client browsers 140 may be avoided. Processing at the server 210 also gives the option of dynamically selecting from among several stylesheets 130. The procedure at the server side may be analogous to server-side styling of XML documents that are not document agents 120.

In both the server side and client side processing discussed herein, the document agent 120 is not directly aware of the processing. Thus, these embodiment are suitable for cases in which a document agent 120 wishes to publish information, but need not be directly involved in each request for a copy. These embodiment are also suitable for debugging document agents 120. Because the document agent 120 has no knowledge of the processing, it will not alter itself in response to the processing. Hence, this embodiment facilitates debugging the document agent 120.

Still referring to FIG. 4, a third embodiment may be termed a document agent 120 responsive implementation. In this case, the document agent 120 is given an opportunity to perform processing in response to an incoming HTTP post/get operation 150. Each new request is converted to an agent communication language (ACL) message 125, and sent to the document agent 120. Then, the document agent 120 processes the message 125, updating itself in the process. The JSP bridge 145 waits for a response from the document agent 120 (indicating it has finished processing), before instructing the client browser 140 to reload the page. That reload may then initiate either a server-side or client-side application of the stylesheet 130. The present invention is not limited to processing HTTP requests 150, nor is it limited to converting the request to an ACL message 125, nor is it limited to the conversion being performed by a JSP bridge 145.

The bottom-most embodiment may be termed a document agent 120 generated response. In this embodiment, an incoming HTTP post/get operation 150 is converted to, for example, an ACL message 125 and sent to the document agent 120. However, in this instance, the document agent 120 itself will respond with an ACL message 125 containing a formatted document suitable for presentation. The document agent 120 has the option of simply sending itself, applying a stylesheet 130 to itself, generating content programmatically, returning a small document which forces the client browser 140 to reload an alternative page, etc.

In embodiments of the present invention, the code embedded in the document agents 120 takes the form of an interpreted language. For example, ECMAScript (European Computer Manufacturer's Association Script) may be modified with a few custom extensions to support sending/receiving/interpreting ACL messages 125, and to simplify interaction with XML-encoded content.

Figure 5:
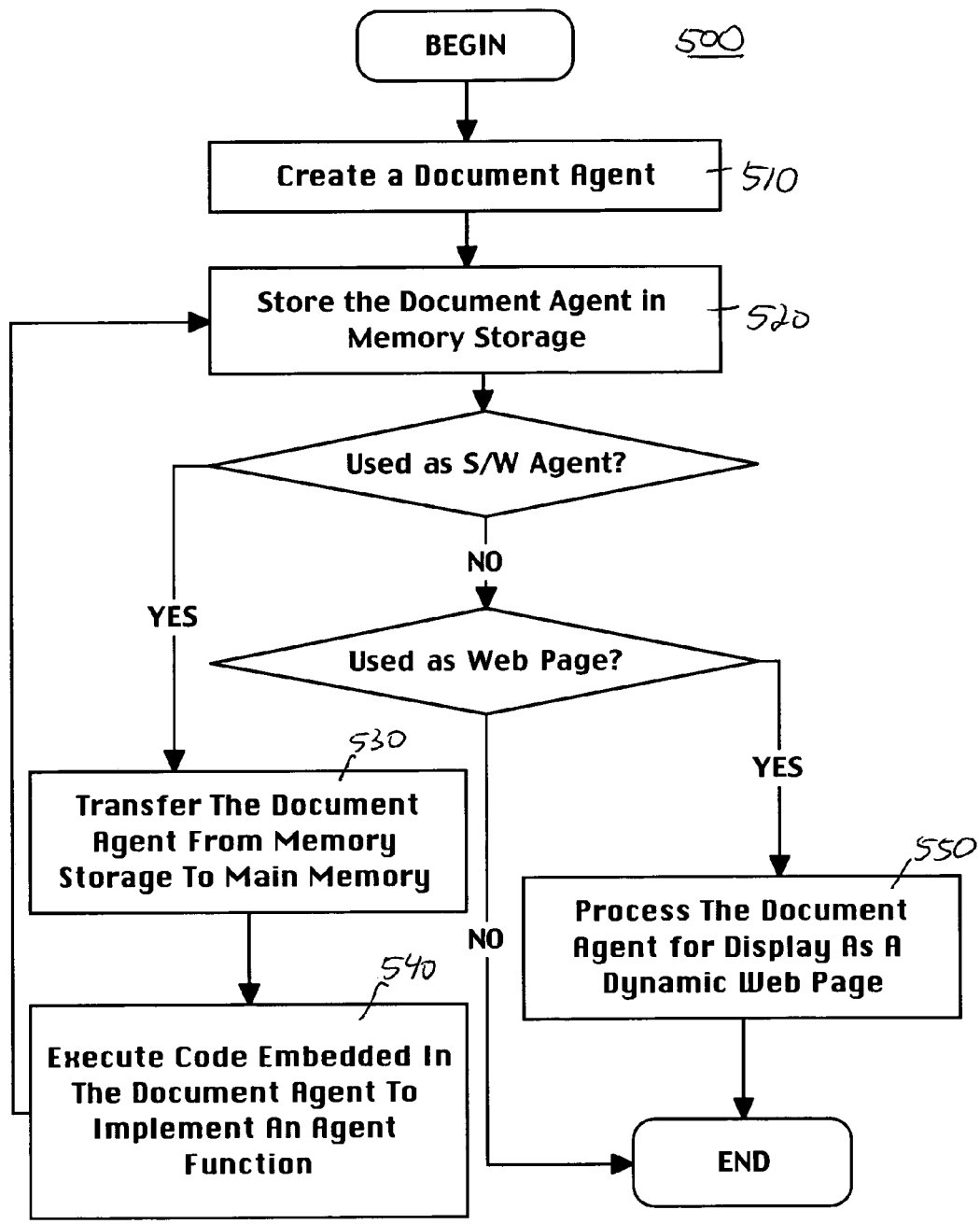
FIG. 5 is flowchart illustrating steps of a process of implementing a software agent document, according to embodiments of the present invention.

An embodiment of the present invention provides a method of generating dynamic web pages, as illustrated in the Process 500 of FIG. 5. In general, upon receiving a new message, a document agent 120 "wakes up," processes the message (optionally updating itself as a side-effect of that processing), and "goes back to sleep." Steps of Process 500 may be stored as instructions on a computer readable medium and executed on a general purpose processor. However, not all steps need be implemented as instructions executed on a general purpose processor. In step 510, a document agent 120 is created. Document agents 120 may be created, for example, based on a canonical template instance, by a computer program, or otherwise.

In step 520, the document agent(s) 120 are stored in memory storage 220. Large numbers of document agents 120 may be stored in memory storage 220 (e.g., hard drive, etc.) to conserve space in main memory 240. As discussed herein, the document agents 120 may be used as software agents 135 and may be accessed as web pages. If the document agent 120 is being used as a software agent 135, step 530 is taken.

Step 530 comprises the document agent 120 waking up, if necessary. In step 530, in response to receiving a message, a document agent 120 is transferred from memory storage 220 to main memory 240. In some cases, the document agent 120 will already be in main memory 240, and thus this step is unnecessary. Embodiments read the document agent 120 into an in-memory DOM (Document Object Model).

The next step comprises processing incoming message(s) 125. In step 540, the document agent 120 executes code embedded in the document agent 120 to implement an agent function. For example, to process a message 125, the system searches the DOM for an appropriate behavior node (e.g., one which contains a matching template for that message 125) and then executes the code within that node. A behavior may be defined as an action to take in response to the occurrence of an event. The code at the behavior node may include instructions to remove a message 125 from the input queue, to send one or more outgoing messages 125 and/or to modify its own DOM.

As discussed herein, the act of performing a single unit of execution may generate an updated DOM, X' which replaces the original. Thus, the document agent 120 may be stored in memory storage 220 at this time. In this implementation, one unit of execution is equivalent to the processing of a single behavior (initiated by a single incoming message 125). In other embodiments, and when using interpreted languages other than ECMAscript, it may be possible (and desirable) to reduce the size of an execution unit below that of a whole behavior. Thus, the updated document agent 120 may be stored in memory storage 240 as frequently or as infrequently as desired. For example, it may be stored after processing a single behavior, less than a single behavior, after the document agent 120 is removed from main memory 240, or at other times.

After the document agent 120 has performed its action(s), it is put back to sleep by removing it from main memory 240 and storing it in memory storage 220, where it waits to be awoken. Thus, step 520 is repeated. The document agent 120 may be stored (and thus made persistent) even if it is kept in main memory 240. In some embodiments, the document agent 120 may awake for each incoming message 125. In others, it may remain awake until some period of inactivity has occurred.

In the event the document agent 120 is to be viewed as a web page (e.g., a dynamic web page), step 550 is taken. In this case, the document agent 120 may be transferred to a client node 150, where it may be read by a web browser 140; it may be read by the server 210 that stores the document agent 120; by, for example, that server 210 or client node 150 applying a stylesheet 130 to the document agent 120. Alternatively, the document agent 120 may apply a stylesheet 130 to itself. In this fashion, document agents 120 may be used to implement dynamic web pages.

Figure 6:
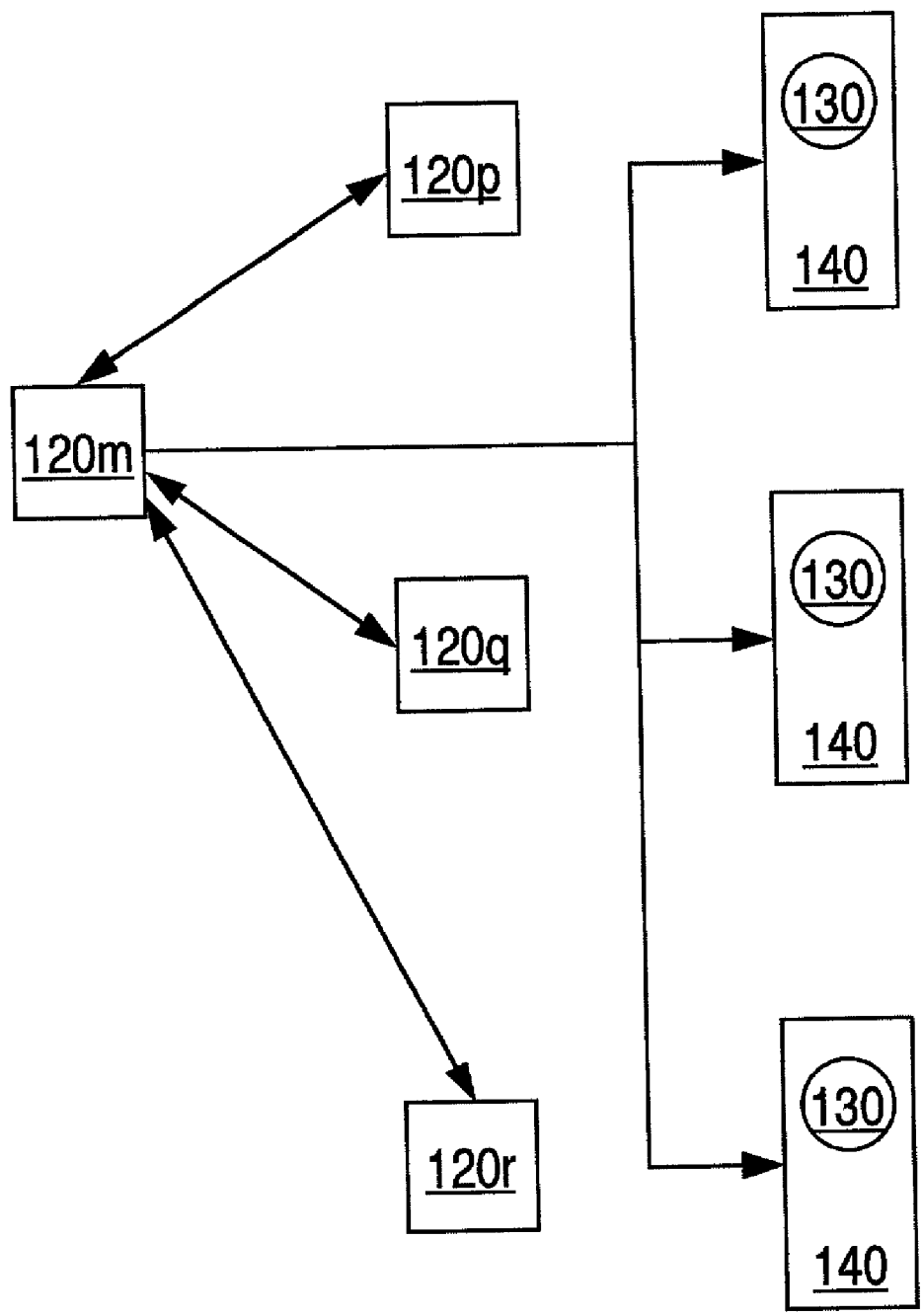
FIG. 6 is a diagram illustrating an example of using document agents, according to embodiments of the present invention.

Referring now to FIG. 6-FIG. 8, an example using document agents 120 will be discussed. In this example, each attendee of an on-line meeting is provided a document agent 120 to assist in taking note of action items, and the meeting itself has a document agent 120 to collect the notes for public display.

Referring now to FIG. 6, there are several document agents 120 (one for the meeting itself 120*m*, and one for each attendee (120*p*, 120*q*, 120*r*). Each document agent 120 supports a single view using a single stylesheet 130.

The document agent 120*m* representing the meeting maintains a list of action items. When it receives an incoming ACL message 125 from one of the attendee's document agents 120*p*, 120*q* or 120*r* containing a new action item, it adds that to its list. This may be implemented by creating a node in the document agent 120*m* to hold action items. When an incoming message 125 arrives, the meeting document agent 120*m* parses the XML describing that item, and appends it to that node.

When the meeting document agent 120*m* is viewed in a browser 140, the client-side application of a stylesheet 130 formats the document agent 120 (including the list of action items) for display as a web page.

FIG. 7A illustrates the XML for an exemplary document agent 120 for collecting action items during a meeting. The exemplary XML for the document agent 120 comprises a prolog line 705 for defining the version of XML that is applicable and an XML-stylesheet processing instruction 710 for linking a stylesheet 130 to the document agent 120. These lines are followed by the program 740 for the agent aspect of the document agent 120. Included in the program 740 is a data node 720 for storing an action-item history.

Referring now to the code within the behavior 730 named "main", when a new message 125 arrives (line 750), the document agent 120 parses the content (line 755) (assuming it contains XML), and then appends (lines 760 and 765) the message content to its data node 720, before constructing a reply (lines 770-780) and sending the reply (lines 785). The final step in the behavior 730 is to increment a count variable (line 790) (which is visible outside the document agent 120 as the tag "var ID=count"). The exemplary document agent 120 has been simplified by hiding code for message validation and error handling.

FIG. 7B illustrates an exemplary document agent 120 that may be formed from the exemplary document agent 120 of FIG. 7A by appending an exemplary item 790 at the data node 720. In this fashion, the document agent 120 may update elements that are readable by a web-browser and displayed as a web page.

Embodiments use ECMAscript (e.g., implemented by calling the FESI (Free EcmaScript Interpreter)), with custom extensions to send and receive ACL messages 125 (e.g., implemented by calling JADE's agent message-handling functions) and to parse content and find nodes in the XML DOM (e.g., implemented by calling Apache's Xerces and Xalan functions).

In addition to manually storing persistent data directly in XML, embodiments persistently store Javascript variables, which are instantiated from the persistent document agents 120 when the script is executed. The persistent store (e.g., memory storage 220) may be updated automatically after every execution step. An execution step may be the processing of a single behavior. However, as discussed herein, embodiments provide for updating the persistence store 220 more or less frequently.

Referring now to FIG. 8, the meeting example is continued with a discussion of the process of adding action items. The document agents 120*p*, 120*q*, 120*r* representing each attendee operate in a similar manner to the document agent 120*m* described herein. Each maintains a list of action items, but this time, they are for a particular attendee at this particular meeting.

When an attendee, for example, client browser 140*p*, adds a new action item (e.g., using the web view of the document agent 120*p*), the resulting HTTP post 150 is translated into an ACL message 125 by the JSP bridge 145 and sent to the document agent 120*p*. Upon receipt, it adds the new action item to its internal list, sends a message to the meeting agent 120*m* (asking it to add the item to the global list).

After the meeting agent 120*m* adds the action item to the global list, it replies to the original message (indicating that processing is complete). That reply causes the client browser 140*p* to reload the page 810, which again causes client-side application of the stylesheet 130, and the updated list becomes visible.

While the present invention has been described in particular embodiments, it should be appreciated that the present invention should not be construed as limited by such embodiments, but rather construed according to the below claims.

What is claimed is:

1. A computer readable medium having stored thereon a data structure to implement a document agent, said structure comprising:
   elements that are readable by a web-browser to display as a web page;
   embedded code to function as a software agent; and
   a shareable state of said embedded code in said document agent within said structure, wherein said structure functions as both a web page and as a software agent.

2. The computer readable medium of claim 1, wherein said structure is substantially compliant with Extensible Markup Language (XML).

3. The computer readable medium of claim 1, wherein said document agent is operable to modify itself in response to received messages.

4. The computer readable medium of claim 3, wherein said document agent is operable to modify said elements, wherein said web page that is displayed is modified.

5. The computer readable medium of claim 3, wherein said document agent is operable to update said embedded code in said document agent by modifying said structure.

6. The computer readable medium of claim 3, wherein said document agent is operable to share said sharable state with another document agent.

7. The computer readable medium of claim 1, wherein said document agent is operable to communicate via an agent messaging system with other software agents.

8. The computer readable medium of claim 7, wherein said other software agents are document agents.

9. The computer readable medium of claim 7, wherein said other software agents are not document agents.

10. The computer readable medium of claim 7, wherein said embedded code is implemented with an interpreted language.

11. A computer readable medium having stored thereon instructions, which when executed on a processor implement a method of generating dynamic web pages, said method comprising:
   a) in response to receiving a message, transferring from memory storage to main memory a document agent;
   b) executing code embedded in said document agent to implement a software agent function, said executing code sharable with other document agents; and
   c) processing said document agent for display as a dynamic web page.

12. The computer readable medium of claim 11, wherein b) of said method comprises altering said document agent by altering a document object model that represents said document agent.

13. The computer readable medium of claim 12, wherein said method further comprises:
   d) storing said document agent in memory storage after said update, wherein said document agent is made persistent.

14. The computer readable medium of claim 11, wherein b) of said method comprises altering data at a data node of a document object model that represents said document agent, wherein said dynamic web page is modified.

15. The computer readable medium of claim 11, wherein b) of said method comprises updating said document agent by altering embedded code within said document agent, wherein said software agent function is modified.

16. The computer readable medium of claim 11, wherein b) of said method comprises said document agent sending an agent message to another software agent.

17. The computer readable medium of claim 11, wherein said message is a Hyper Text Transport Protocol message, and wherein a) of said method further comprises:
   converting said Hyper Text Transport Protocol message into an Agent Communication Language message; and
   sending said Agent Communication Language message to said document agent.

18. The computer readable medium of claim 11, wherein said method further comprises:
   d) copying said document agent, wherein said document agent is cloned.

19. The computer readable medium of claim 11, wherein said method further comprises:
   d) transferring said document agent to another processor, wherein said document agent is migrated.

20. The computer readable medium of claim 11, wherein said method further comprises:
   d) querying the state of said document agent by using an Xpath/Xpointer expression.

21. The computer readable medium of claim 11, wherein c) of said method comprises processing said document agent with a stylesheet.

22. A system for providing document agents, said system comprising:
   a first memory having stored thereon a plurality of said document agents, said document agents comprising an Extensible Markup Language (XML) structure that is accessible as a web page and that has embedded code to function as a software agent, said embedded code having a state sharable among said document agents, wherein said structure is both a web document and a software agent;
   a processor coupled to said first memory and for executing said document agents as software agents; and
   a second memory coupled to said processor and for making said document agents accessible as web pages.

23. The system of claim 22, further comprising:
   means for converting Hyper-Text Transport Protocol messages to Agent Communication Language messages and for sending said Agent Communication Language messages to said document agents.

24. The system of claim 23, wherein said document agents are operable to process said Agent Communication Language messages and to act based on said Agent Communication Language messages.

25. The system of claim 22, further comprising:
   means for transferring said document agents to a client.

26. The system of claim 22, wherein said document agents are operable to exchange agent messages with software agents.

27. The system of claim 22, further comprising:
   means for applying a stylesheet to said document agents, wherein said document agents are viewable as web pages.

* * * * *

UNITED STATES PATENT AND TRADEMARK OFFICE
CERTIFICATE OF CORRECTION

| | | |
|---|---|---|
| PATENT NO. | : 7,447,991 B2 | |
| APPLICATION NO. | : 10/114384 | |
| DATED | : November 4, 2008 | |
| INVENTOR(S) | : Craig P. Sayers et al. | |

It is certified that error appears in the above-identified patent and that said Letters Patent is hereby corrected as shown below:

Title Page, Item (75), in "Inventors", delete "Sunnyvale" and insert -- Menlo Park --, therefor.

Signed and Sealed this

Fourth Day of August, 2009

JOHN DOLL
*Acting Director of the United States Patent and Trademark Office*